(12) United States Patent
Mandelstein et al.

(10) Patent No.: US 8,898,104 B2
(45) Date of Patent: Nov. 25, 2014

(54) AUTO-MAPPING BETWEEN SOURCE AND TARGET MODELS USING STATISTICAL AND ONTOLOGY TECHNIQUES

(75) Inventors: Dan J. Mandelstein, Austin, TX (US);
Ivan M. Milman, Austin, TX (US);
Martin A. Oberhofer, Bondorf (DE);
Sushain Pandit, Ames, IA (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 13/190,766

(22) Filed: Jul. 26, 2011

(65) Prior Publication Data

US 2013/0031117 A1  Jan. 31, 2013

(51) Int. Cl.
*G06F 7/00* (2006.01)
*G06F 17/00* (2006.01)
*G06F 17/30* (2006.01)

(52) U.S. Cl.
CPC ........ *G06F 17/303* (2013.01); *G06F 17/30914* (2013.01)
USPC .......................................................... 707/602

(58) Field of Classification Search
CPC ................................................ G06F 17/30705
USPC .......................................................... 707/602
See application file for complete search history.

(56) References Cited

U.S. PATENT DOCUMENTS

| | | | |
|---|---|---|---|
| 5,315,709 A * | 5/1994 | Alston et al. ......................... | 1/1 |
| 5,392,390 A | 2/1995 | Crozier | |
| 5,555,346 A | 9/1996 | Gross | |
| 5,561,793 A | 10/1996 | Bennett et al. | |
| 5,586,025 A | 12/1996 | Tsuji | |
| 5,684,990 A | 11/1997 | Boothby | |
| 5,729,665 A | 3/1998 | Gauthier | |
| 5,761,671 A | 6/1998 | Blackman et al. | |

(Continued)

FOREIGN PATENT DOCUMENTS

| | | |
|---|---|---|
| EP | 0513653 A2 | 11/1992 |
| EP | 1798684 A1 | 6/2007 |
| JP | 2007279852 A | 10/2007 |
| WO | 0062191 | 10/2000 |

OTHER PUBLICATIONS

International Search Report and Written Opinion, PCT/EP2011/062074, Sep. 21, 2012, 16 pages.

(Continued)

*Primary Examiner* — Fred I Ehichioya
*Assistant Examiner* — Kris Mackes
(74) *Attorney, Agent, or Firm* — Susan Murray; Edell, Shapiro & Finnan, LLC (57) ABSTRACT

A system maps data within a data source to a target data model, and comprises a computer system including at least one processor. The system determines an identifier for each data object of the data source based on the data within that data object, wherein the identifier indicates for that data object a corresponding concept within a domain ontological representation of a data model of the data source. The determined identifiers for the data objects of the data source are compared to the target data model to determine mappings between the data objects of the data source and the target data model. Data objects from the data source are extracted for the target data model in accordance with the mappings. Present invention embodiments further include a method and computer program product for mapping data within a data source to a target data model.

21 Claims, 6 Drawing Sheets

(56) References Cited

U.S. PATENT DOCUMENTS

| | | | |
|---|---|---|---|
| 5,802,253 A | 9/1998 | Gross | |
| 5,943,676 A | 8/1999 | Boothby | |
| 5,966,717 A | 10/1999 | Sass | |
| 6,029,160 A | 2/2000 | Cabrera et al. | |
| 6,044,381 A | 3/2000 | Boothby et al. | |
| 6,076,090 A | 6/2000 | Burroughs et al. | |
| 6,154,748 A | 11/2000 | Gupta et al. | |
| 6,230,157 B1 | 5/2001 | Malcolm et al. | |
| 6,279,008 B1 | 8/2001 | Ng et al. | |
| 6,301,584 B1 | 10/2001 | Ranger | |
| 6,408,302 B1 | 6/2002 | Lee et al. | |
| 6,460,048 B1 | 10/2002 | Teng et al. | |
| 6,496,835 B2 | 12/2002 | Liu et al. | |
| 6,609,133 B2 | 8/2003 | Ng et al. | |
| 7,039,898 B2 | 5/2006 | Shah | |
| 7,043,492 B1 | 5/2006 | Neal | |
| 7,069,269 B2 | 6/2006 | Morris | |
| 7,080,088 B1* | 7/2006 | Lau | 1/1 |
| 7,136,852 B1 | 11/2006 | Sterling et al. | |
| 7,437,471 B2 | 10/2008 | Hohmann | |
| 7,472,346 B2 | 12/2008 | Baelen | |
| 7,536,409 B2 | 5/2009 | Barcia | |
| 7,657,506 B2 | 2/2010 | Levin | |
| 7,797,289 B2 | 9/2010 | Chan et al. | |
| 7,814,045 B2 | 10/2010 | Hermann et al. | |
| 7,921,110 B1 | 4/2011 | Ting et al. | |
| 7,958,162 B2 | 6/2011 | Basile et al. | |
| 8,266,168 B2 | 9/2012 | Bayliss | |
| 8,478,705 B2 | 7/2013 | Meeks et al. | |
| 8,666,998 B2 | 3/2014 | Nelke et al. | |
| 2001/0014890 A1 | 8/2001 | Liu et al. | |
| 2002/0007482 A1 | 1/2002 | Cirne | |
| 2002/0089681 A1 | 7/2002 | Gauthier | |
| 2002/0143761 A1 | 10/2002 | Shimano | |
| 2002/0143818 A1 | 10/2002 | Roberts | |
| 2003/0225742 A1 | 12/2003 | Tenner et al. | |
| 2004/0083199 A1 | 4/2004 | Govindugari et al. | |
| 2005/0050068 A1* | 3/2005 | Vaschillo et al. | 707/100 |
| 2005/0091640 A1 | 4/2005 | McCollum | |
| 2005/0131771 A1 | 6/2005 | Tischer | |
| 2005/0182777 A1 | 8/2005 | Block et al. | |
| 2005/0197931 A1 | 9/2005 | Gupta | |
| 2005/0262113 A1* | 11/2005 | Arora et al. | 707/100 |
| 2005/0283486 A1 | 12/2005 | Lauterbach et al. | |
| 2006/0026127 A1 | 2/2006 | Bodlaender | |
| 2006/0101423 A1* | 5/2006 | Aharoni et al. | 717/136 |
| 2006/0230025 A1 | 10/2006 | Baelen | |
| 2006/0242181 A1 | 10/2006 | Mueller-Klingspor | |
| 2007/0083607 A1* | 4/2007 | Thompson et al. | 709/217 |
| 2007/0112827 A1 | 5/2007 | Dettinger | |
| 2007/0198910 A1 | 8/2007 | Jensen | |
| 2007/0239707 A1* | 10/2007 | Collins et al. | 707/5 |
| 2008/0140602 A1 | 6/2008 | Roth et al. | |
| 2008/0177731 A1 | 7/2008 | Matsuzaki | |
| 2008/0201172 A1 | 8/2008 | McNamar | |
| 2008/0208855 A1 | 8/2008 | Lingenfelder | |
| 2008/0275829 A1 | 11/2008 | Stull et al. | |
| 2008/0319983 A1 | 12/2008 | Meadows et al. | |
| 2009/0006282 A1 | 1/2009 | Roth et al. | |
| 2009/0006283 A1 | 1/2009 | Labrie et al. | |
| 2009/0006472 A1 | 1/2009 | Bush et al. | |
| 2009/0019358 A1 | 1/2009 | Blake | |
| 2009/0024551 A1 | 1/2009 | Agrawal et al. | |
| 2009/0030754 A1 | 1/2009 | McNamar | |
| 2009/0037488 A1 | 2/2009 | Abrams | |
| 2009/0138789 A1 | 5/2009 | Tangen et al. | |
| 2009/0287923 A1 | 11/2009 | Topalov et al. | |
| 2010/0131526 A1 | 5/2010 | Sun et al. | |
| 2011/0178971 A1 | 7/2011 | Meeks et al. | |
| 2011/0196621 A1 | 8/2011 | Huyse et al. | |
| 2011/0225173 A1 | 9/2011 | Gulhane et al. | |
| 2012/0066214 A1 | 3/2012 | Nelke et al. | |
| 2012/0095970 A1* | 4/2012 | Shyam et al. | 707/690 |
| 2012/0096434 A1 | 4/2012 | Rama | |
| 2012/0158625 A1 | 6/2012 | Nelke et al. | |
| 2012/0158678 A1 | 6/2012 | McGraw et al. | |
| 2012/0197836 A1 | 8/2012 | Meeks et al. | |
| 2012/0216274 A1 | 8/2012 | Chauhan et al. | |
| 2012/0254739 A1* | 10/2012 | Dehmann et al. | 715/255 |
| 2012/0330911 A1 | 12/2012 | Gruenheid et al. | |

OTHER PUBLICATIONS

Mason B. McDaniel, "An Algorithm for Content-Based Automated File Type Recognition, Master Thesis", James Madison University, www.forensicswiki.org/w/images/f/f9/Mcdaniel01.pdf Dec. 1, 2001, 105 pages.

International Search Report and Written Opinion, PCT/IB2012/053380, Nov. 15, 2012, 10 pages.

"Legacy Data Encapsulator", ip.com, Jun. 14, 2001, 3 pages.

Koch et al., "Policy Definition Language for Automated Management of Distributed Systems", (1996) IEEE 2nd Int'l of Distrib. Sys., pp. 55-64.

Computer Associates International et al., Chapters 7-9, "Truth Maintenance", Computer Associates International, Inc., 70 pages, Jan. 1, 2004.

PCT International Search Report and Written Opinion, PCT/EP2011/069332, Jan. 5, 2012, 12 pages.

Wolfgang May, "A Database-Based Service for Handling Logical Variable Bindings", Institut fur Informatik, Universitat Gottingen, Germany, 14 pages, Jan. 1, 2009.

Computer Associates International et al., CleverPath Avion Business Rules Expert, Computer Associates International, Inc., 64 pages, Jan. 1, 2004.

Computer Associates International et al., Chapter 5 "Pattern Matching, Pattern Matching Rules", Computer Associates International, Inc., 36 pages, Jan. 1, 2004.

Computer Associates International et al., Chapter 7 "Truth Maintenance, Truth Maintenance Operations and Terminology", and Chapter 8 Maintaining the Dynamic Rulebase, Computer Associates International, Inc., 12 pages, Jan. 1, 2004.

http://www.xbrl.org/TaxonomyRecognition/US%20GAAP%202009/XBRLUS-USGAAP, "XBRL US Country Taxonomy 2009", pp. 1-2.

http://www.xbrl.org/TaxonomyRecognition/US%20GAAP%202009/XBRLUS-USGAAP, "XBRL US Accountants' Report Taxonomy 2009", pp. 1-2.

http://www.xbrl.org/TaxonomyRecognition/US%20GAAP%202009/XBRLUS-USGAAP, "XBRL US GAAP Taxonomy 2009", pp. 1-2.

http://www.w3.org/TR/owl-parsing/ "OWL Web Ontology Language Parsing OWL in RDF/XML", W3C Working Group Note Jan. 21, 2004, pp. 1-20.

Pauvel Shvaiko et al., "Ontology Matching OM-2009", Papers from the ISWC Workshop, pp. 1-271.

* cited by examiner

AUTO-MAPPING BETWEEN SOURCE AND TARGET MODELS USING STATISTICAL AND ONTOLOGY TECHNIQUES

BACKGROUND

1. Technical Field

The present invention relates to data mapping, and more specifically, to mapping data from a source data model (e.g., a data warehouse) to a target data model (e.g., eXtensible Business Reporting Language (XBRL) used to file annual reports with a financial authority (e.g., New York Stock Exchange, Securities Exchange Commission (SEC)). This enables extraction of appropriate data from the source data model (e.g., data warehouse) for insertion into the target data model (e.g., XBRL-based report).

2. Discussion of the Related Art

Many companies produce financial reports for their share holders in XBRL (eXtensible Business Reporting Language). XBRL provides an eXtensible Markup Language (XML)-based data format that enables electronic communication of business and financial information. Each piece of information is tagged using standardized vocabulary defined in an XBRL taxonomy. For example, net revenue may include a unique XBRL element. However, in cases where a data warehouse model providing information for the XBRL report is not suited to, or close enough for, efficient report generation, substantial structural transformations of the data warehouse may be needed in order to supply the proper report information.

BRIEF SUMMARY

According to one embodiment of the present invention, a system maps data within a data source to a target data model, and comprises a computer system including at least one processor. The system determines an identifier for each data object of the data source based on the data within that data object, wherein the identifier indicates for that data object a corresponding entity within a representation of a data model of the data source. The determined identifiers for the data objects of the data source are compared to the target data model to determine mappings between the data objects of the data source and the target data model. Data objects from the data source are extracted for the target data model in accordance with the mappings. Embodiments of the present invention further include a method and computer program product for mapping data within a data source to a target data model in substantially the same manner described above.

DETAILED DESCRIPTION

Present invention embodiments pertain to mapping data from a source data model (e.g., a data warehouse) to a target data model (e.g., eXtensible Business Reporting Language (XBRL) used to file annual reports with a financial authority (e.g., New York Stock Exchange, Securities Exchange Commission (SEC)). This enables extraction of appropriate data from the source data model (e.g., data warehouse) for insertion into the target data model (e.g., XBRL-based report).

Since XBRL is built on XML, XBRL must comply with the requirements for XML. However, XBRL provides advantages with respect to XML. For example, XBRL enables semantics across elements which cannot be expressed using native XML. Furthermore, these semantic expressions can be validated. XBRL is flexible with greater ability to allow change. By way of example, XBRL maintains schema and data separately, where XBRL instance documents are basically containing only data immune to the sequence of the data and without hierarchy. Thus, the XBRL taxonomy can be changed (e.g. adding additional child elements, etc.) with no need to re-format the XBRL instance documents. XBRL instance documents are normalized, allowing to store them more easily in a relational database. Finally, XBRL supports multi-dimensional modeling and the dimensions support set operations. For example, a US-GAAP taxonomy exploits these capabilities. Although XBRL provides various advantages over XML, the following issues should be considered. Initially, there are many different XBRL taxonomies for various purposes, where XBRL extensions may be built on existing taxonomies, or new taxonomies may be created. Further, names (e.g., depreciation, etc.) appear in some taxonomies numerous times on different levels of the taxonomy, and are utilized with different meanings causing naming conflicts.

In addition, the weight attribute of elements should be considered. For example, liabilities are negative numbers, but that semantic is part of the element description so in the XBRL source the value would be a positive number.

Present invention embodiments are described, by way of example, with respect to mapping data between a source data model corresponding to a data warehouse and a target data model corresponding to an XBRL-based report. However, present invention embodiments are not limited to these example embodiments, and may be utilized to map data between any desired source and target data models in substantially the same manner described below.

Figure 1:
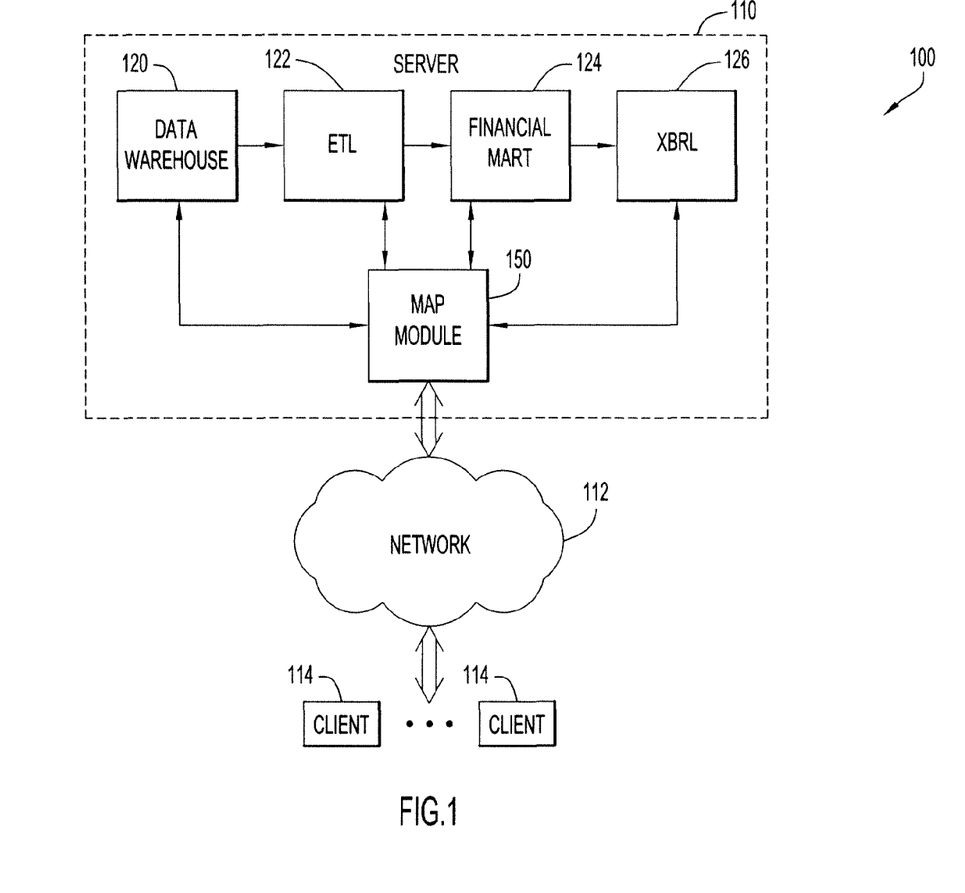
FIG. 1 is a diagrammatic illustration of an example computing environment for use with an embodiment of the present invention.

An example environment for use with present invention embodiments to generate XBRL reports is illustrated in FIG. 1. Specifically, environment 100 includes one or more server systems 110, and one or more client or end-user systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 enable users to interact with server system 110 to perform various operations (e.g., generate reports, etc.). The information for the reports is stored within one or more data warehouse systems 120 described below. The data warehouse systems may be implemented by any conventional or other databases or storage units, may be local to or remote from server systems 110 and client systems 114, and may communicate via any appropriate communication medium (e.g., local area network (LAN), wide area network (WAN), Internet, hardwire, wireless link, Intranet, etc.).

Server system 110 generates XBRL-based reports 126, and includes data warehouse system 120 to store data, an Extract Transform Load (ETL) system 122 for extracting data from data warehouse system 120, and a financial mart system 124 to generate XBRL-based reports 126. Each of these components may reside on one or more server systems 110. For example, data warehouse system 120, ETL system 122, and financial mart system 124 may reside on a common server (e.g., a server with a plurality of logical partitions (LPAR) (e.g., a maximum of 64 cores with one terabyte (TB) of RAM)) for hosting virtualized computer systems. Alternatively, each of these systems may reside on separate servers and communicate over a network. However, any quantity of servers may be utilized to host one or more of these systems (e.g., one system may be hosted by one or more servers, a server may host one or more of these systems, etc.).

Data warehouse, ETL, and financial mart systems 120, 122, 124 may each include various software modules to perform associated tasks. For example, the data warehouse system may include an operating system, IBM® DB2® database software (e.g., DB2, etc.), data warehousing software (e.g., IBM® InfoSphere® Warehouse including text analytics, data mining, cubing services, etc.), and optional reporting (e.g., COGNOS®, etc.) and analytics (e.g., predictive analytics using SPSS®, etc.) software. (IBM, DB2, InfoSphere, Cognos and SPSS are trademarks of International Business Machines Corporation, registered in many jurisdictions worldwide.) The ETL system may include an operating system (e.g., AIX, etc.), database software (e.g., DB2, etc.), and ETL software (e.g., IBM InfoSphere Information Server, etc.). The financial mart system may include an operating system, IBM® DB2® database software (e.g., DB2, etc.), and optional data warehousing (e.g., InfoSphere Warehouse, etc.) and reporting (e.g., COGNOS®, etc.) and/or analytics (e.g., predictive analytics using SPSS®, etc.) software.

Server systems 110 and client systems 114 may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, map and other modules, browser/interface software, etc.). Client systems 114 may present a graphical user (e.g., GUI, etc.) or other interface (e.g., command line prompts, menu screens, etc.) to solicit information from users pertaining to the desired operations, and provide various reports.

XBRL-based reports 126 are typically generated by initially computing aggregates from data warehouse system 120, and storing the aggregates as cubes in the data warehouse system or dedicated financial mart 124 for reporting. The aggregation may be accomplished with cubing services, and may require further cleansing in case the data is of insufficient quality. In addition, data warehouse system 120 may need substantial structural transformations when the data model for the data warehouse system is not suited to, or close enough for, efficient XBRL-based report generation. The XBRL-based reports are generated based on the aggregated data in the cubes or dedicated financial mart 124, and an XBRL instance document is produced.

However, some complications arise with respect to extracting appropriate data for the report from the data warehouse system. For example, data models for the data warehouse system are rarely, if ever, documented. Thus, manually searching for the fields of the data warehouse system which are required for the XBRL-based reports is time consuming. Further, manual mappings are often inaccurate.

Moreover, issues may arise with respect to mapping between ontologies of the data warehouse system and XBRL-based report, even in the presence of a documented data model, a domain ontology and use of an ontology mapping tool. For example, the data warehouse model typically includes thousands of attributes. In addition, a match of attribute names rarely exists and, if a match exists, the attribute names typically identify different elements (or have different semantics) (e.g., endDate in one data model may refer to an end of contract, while endDate in another data model may refer to an end of promotion offering).

Granularity level of model concepts is often different between data models since generators of data models have the tendency to map to generic, rather than more specific concepts, thereby making the mappings less useful in data integration scenarios (e.g., mapping elements to generic classes, mapping elements to subtypes even when the superclass is the appropriate match, mapping elements that are simply invalid or incorrect, etc.).

Accordingly, identifying and extracting data from the data warehouse system to generate XBRL-based reports may encounter various complications including: many different XBRL taxonomies existing that each require a mapping to the data warehouse system for different reporting needs; manual mappings often being incorrect and time consuming; pure ontology mappings being insufficient; mapping of field names of the data warehouse system to XBRL being inadequate (e.g. cryptic column names, such as KTOKD, rarely, if ever, match with XBRL taxonomy names); and technical metadata often being misleading (e.g. metadata of character type when integers are stored, etc.).

Present invention embodiments map data from a source data model (e.g., data warehouse system 120) to appropriate corresponding data in a target data model (e.g., XBRL). Accordingly, server system 110 further includes a map module 150 to map data between data warehouse system 120 and an XBRL-based report 126 as described below. The map module computes data classification identifiers or fingerprints, and compares these fingerprints with technical metadata of a data model of data warehouse system 120 to identify a data domain based on the fingerprints (e.g. address data, name, etc.). The domain is verified and metadata is produced indicating that data types of the data and domain may be incorrect. Map module 150 further proposes a logical data warehouse model with a fingerprint for review by a user. Once approved, ontology matching is utilized to map the enriched logical data warehouse model (with fingerprint) to an XBRL model. The insight from the data retrieved through profiling and anti-pattern detection is exploited in the matching. Once mapping is approved, ETL jobs for XBRL data preparation are generated, and XBRL metadata is extracted into job generation (e.g., weight attributes) to compute appropriate numbers.

The mapping of present invention embodiments provides several advantages. In particular, autonomic discovery of relevant data for a target data model (e.g., an XBRL report) is performed in a source data model (e.g., a data warehouse system) with correct mapping between the source and target data models. Further, automatic generation of a complete infrastructure is attained in order to generate an XBRL report using ETL job generation tools. In addition, weights are interpreted to extract data correctly (e.g., adjust positive and negative (+/−) values accordingly).

Figure 2:
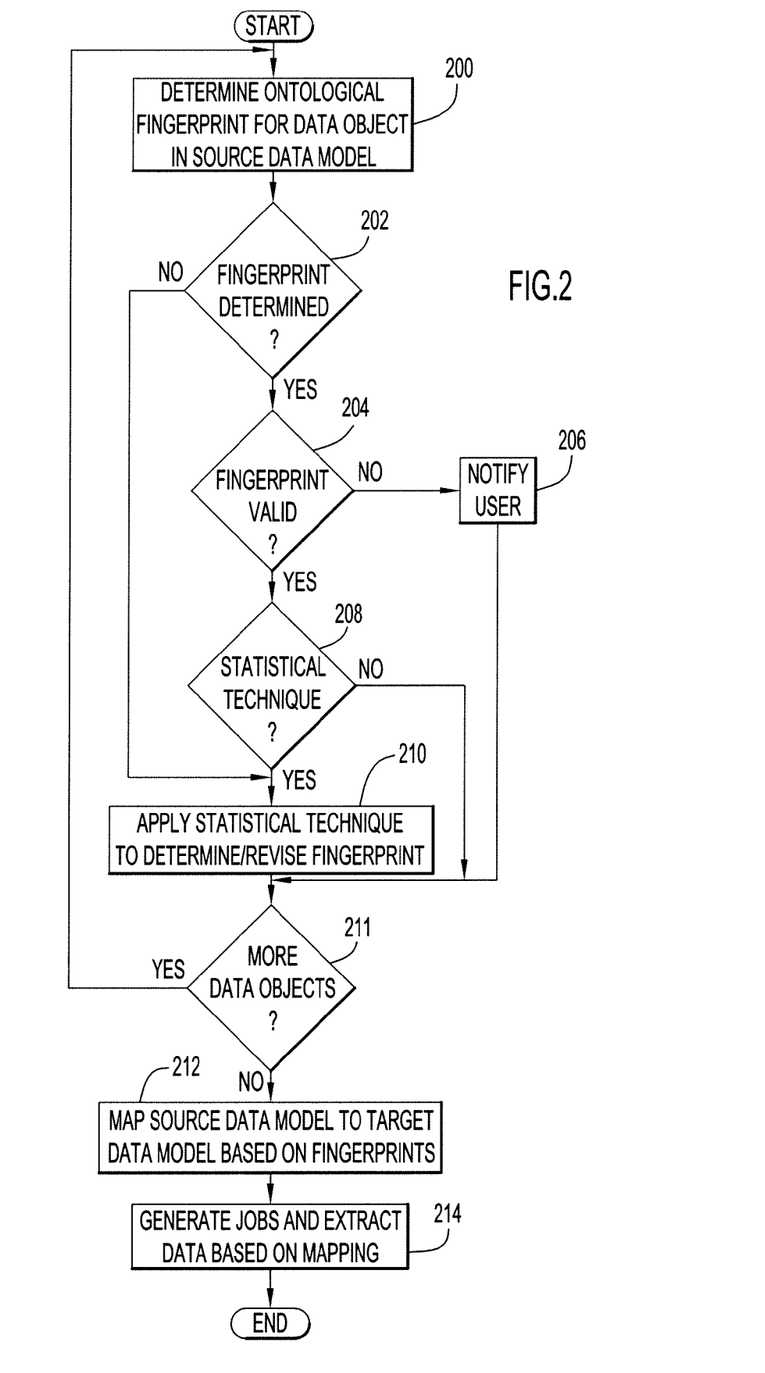
FIG. 2 is a procedural flow chart illustrating the manner in which a source data model is mapped to a target data model according to an embodiment of the present invention.

A manner in which server system 110 (e.g., via map module 150) maps data between a source data model (e.g., corresponding to data warehouse system 120) and a target data model (e.g., corresponding to an XBRL-based report 126) is illustrated in FIG. 2. Initially, a data classification identifier or fingerprint is determined for a data object of the source data model (e.g., a column of a table in the case of data warehouse system 120) based on the data elements within that object at step 200. Ontologies are typically represented in graphical form including nodes representing classes, domains, or instances, and connections between the nodes representing relations with appropriate domains and ranges (e.g., FIG. 3B, where a class "Car" may have a relationship "hasColor" with the class "Color", which in turn, may have a subclass relationship (or "hasValue" relationship depending on the modeling approach chosen) with concepts of "Red" and "Green" of type text or string). The following set representing a data classification fingerprint for a data object (e.g., a column C of a table in data warehouse system 120 including data elements $c_i$) is determined based on the existence of an enterprise ontology, a set of ontologies, or a set of ontologies and instances for the source data model.

Figure 3A:
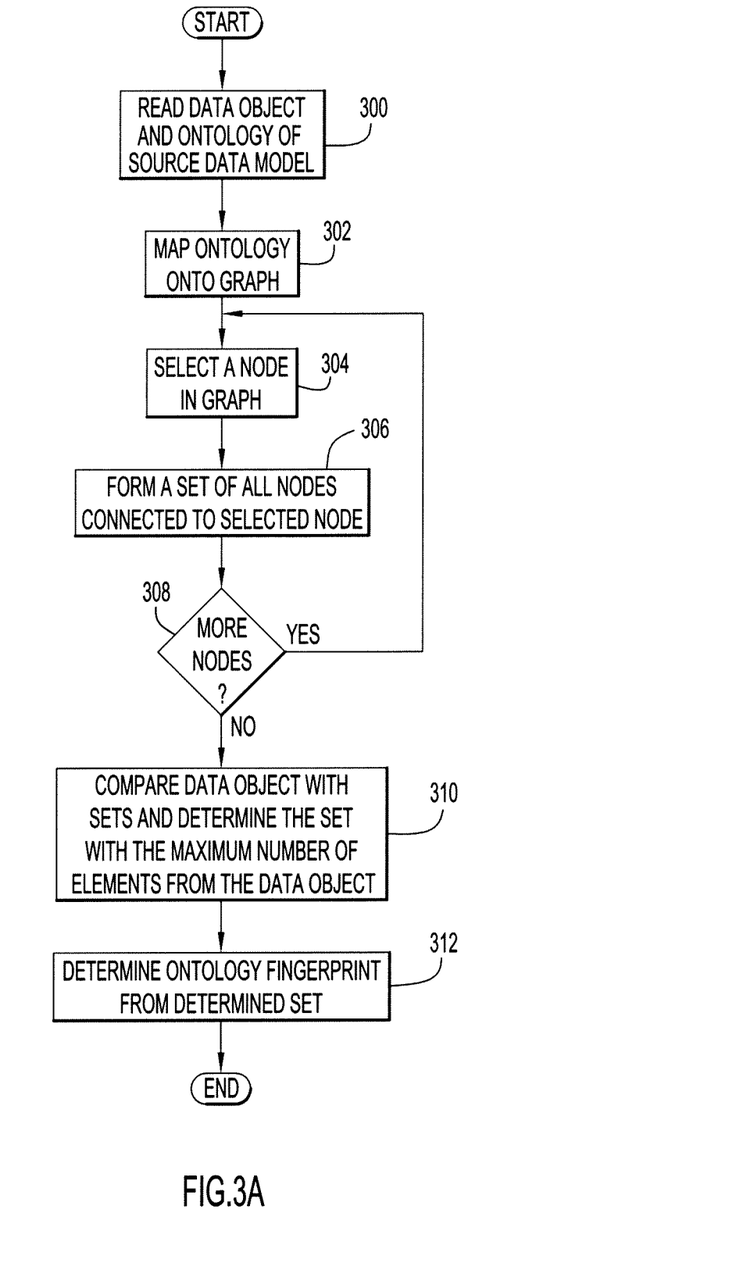
FIG. 3A is a procedural flow chart illustrating the manner in which an ontology fingerprint for a data object of a source data model is determined according to an embodiment of the present invention.

{V', Range (r), Domain (r), $\{c_i\}$};
where V' is an ontological fingerprint, r is the relation that connects V' to a set of nodes in the ontology representing a subset of $\{c_i\}$, Range (r) indicates the data type for the node, Domain (r) indicates the domain, and $c_i$ are the data elements of the data object (e.g., values in column C of the table in data warehouse system 120). The ontology fingerprint, V', indicates the domain or class within the source data ontology for the data object, and is utilized for comparisons to determine mappings between the source and target data models as described below. For example, a resulting classification fingerprint for a table column with values of "Red" and "Green" (based on an example source ontology of FIG. 3B) may include: an ontological fingerprint, V', indicating the class "Color"; a Range (r) of string (where the relation, r, is "subclass"); a Domain (r) of "Color" (or a more general class, called "Thing"); and data elements, $\{c_i\}$ of "Red" and "Green". The ontological fingerprint, V', may be determined from a maximal value partition, V*, or a node connected to a set of nodes representing a subset of the data elements in the data object ($\{c_i\}$) as described below (FIG. 3A). In other words, the ontological fingerprint V' represents a potential data domain within the source data model ontology for the data object.

If an ontological fingerprint, V', is able to be determined from the data elements within the data object as determined at step 202, the ontological fingerprint is validated at step 204. The validation is performed by ensuring the data type of the data object is consistent with the data type of the resulting ontological fingerprint. For example, Range (r) indicates the presence of inconsistent data types or any other metadata. By way of example, Range (r) may indicate a data type of integer for the ontological fingerprint, V', while the data type for the data object (e.g., column of the table in data warehouse system 120) may be bigint, thereby being consistent and indicating a valid ontological fingerprint. Further, Range (r) may indicate a data type of Boolean for the ontological fingerprint, V', while the data type for the data object (e.g., column of the table in data warehouse system 120) may be String, thereby being inconsistent and indicating an invalid ontological fingerprint. When the ontological fingerprint is invalid, a user is notified of the inconsistencies at step 206.

When the ontological fingerprint is valid as determined at step 204, and a statistical technique is desired as determined at step 208, the statistical technique (described below) may be applied at step 210 to revise the ontological fingerprint for enhanced correlation with the data object. In addition, the statistical technique is applied to determine the ontological fingerprint in response to the failure to determine an initial ontological fingerprint at step 200 as determined at step 202.

Once a valid ontological fingerprint, V', is determined, the remaining values of the classification fingerprint (e.g., Range (r), Domain (r), $\{c_i\}$) may be determined from the ontology and/or data object to form a resulting classification fingerprint. The above process is repeated to determine classification fingerprints for remaining data objects within the source data model (e.g., corresponding to data warehouse system 120). When classification fingerprints have been determined for all the data objects within the source data model (e.g., corresponding to data warehouse system 120) as determined at step 211, the source data model is mapped to the target data model (e.g., corresponding to XBRL) as described below based on the classification fingerprints at step 212.

ETL based jobs are subsequently generated (e.g., utilizing common tools, such as IBM InfoShpere FastTrack, etc.) at step 214 based on the mappings to extract appropriate data from the source data model (e.g., corresponding to data warehouse system 120) for insertion into the target data model (e.g., corresponding to XBRL).

A manner in which server system 110 (e.g., via map module 150) determines an ontological fingerprint, V', (e.g., step 200 of FIG. 2) according to an embodiment of the present invention is illustrated in FIG. 3A. Initially, the ontological fingerprint is determined based on a maximal value-partition, V*. A value-partition (e.g., essentially a design pattern) may be defined in the context of an ontology for the source data model (e.g., corresponding to data warehouse system 120). A domain representation includes many attributes or modifiers that are used to describe other concepts within an ontology. A specified collection of values exists for these concepts within any one ontology. There can be assumed to exist a direct correlation between these attributes and values for the data object (e.g., table column data values) and between the collection of values and the data objects (e.g. table columns).

There are different ways to represent the specified collections of values including: disjoint classes which exhaustively partition a parent class; individuals, the enumeration of which, composes the parent class; and data-types. However, data types are usually used when there are literal, numeric or derived data types, rather than when there is an enumerated list of values. By way of example, present invention embodiments utilize the disjoint class representation of the specified collection of values described above. However, present invention embodiments may utilize other representations for the specified collection of values.

With respect to a class concept, N, captured in an ontology, a value-partition, V, is defined to be a set of classes $n_i$, such that N=Union ($n_i$) and all $n_i$ are disjoint. This essentially partitions the class N into $n_i$ partitions and, thus, V is a partitioning of the class N. This may be referred to as an 'enumeration', 'partition', 'set' or related variants. Further, a maximal value partition, V*, in an ontology with respect to a set D is the value partition, V, that contains the maximum elements from set D.

Accordingly, a maximal partition, V*, for a data object (e.g., a table column C with data elements $\{c_i\}$ in data warehouse system 120) may be determined as follows. Initially, an ontology for the source data model (e.g., data warehouse system 120) and the data object (e.g., table column C=$\{c_i\}$) are retrieved at step 300. Since the ontology is preferably defined in accordance with Web Ontology Language (OWL)-lite conventions, a corresponding Resource Description Framework (RDF) graph for the ontology may be determined, and the ontology is mapped to an equivalent RDF graph at step 302. An example graphical representation of an ontology including nodes representing domains, classes, or instances, and connections representing relations is illustrated in FIG. 3B.

A node is initially selected from the graph at step 304. A Breadth-First Search is preferably performed from the selected node to determine all the nodes that are directly connected to the selected node. However, any search technique may be utilized (e.g., Breadth-First Search, Depth-First Search, best-first, etc.). These connected nodes are formed into a set, D, at step 306. The selected node is marked as visited, and one of the connected nodes is selected as a new node to determine its connected nodes and form the set D as described above.

The above process is repeated for all the nodes in the graph to form a corresponding set, $D_i$, for each node, i, in the graph (e.g., i=1 to n (the number of nodes in the graph)). Once each of the nodes have been traversed as determined at step 308, the data elements of the data object (e.g., table column C=$\{c_i\}$) are compared with each set, D, (e.g., for i=1 to n), to determine the set D, with the maximum number of elements from the data object (e.g., table column C) at step 310. The identified maximal value set, $D_i$, serves as the maximal value partition V*, and is utilized to provide the ontological fingerprint, V', at step 312. Basically, the maximum value partition, V*, identifies the node to which each of the nodes in the maximal value set is connected. The identified connected node represents the class or domain in the ontology to which the data object (e.g., table column C) belongs, and provides the ontological fingerprint (e.g., class or domain name), V', for mapping to the target data model (e.g., XBRL). The remaining elements of the classification fingerprint (e.g., Range (r), Domain (r), etc.) may be determined from metadata and/or attributes pertaining to the ontology graph and/or nodes relating to the maximal value set.

Figure 3B:
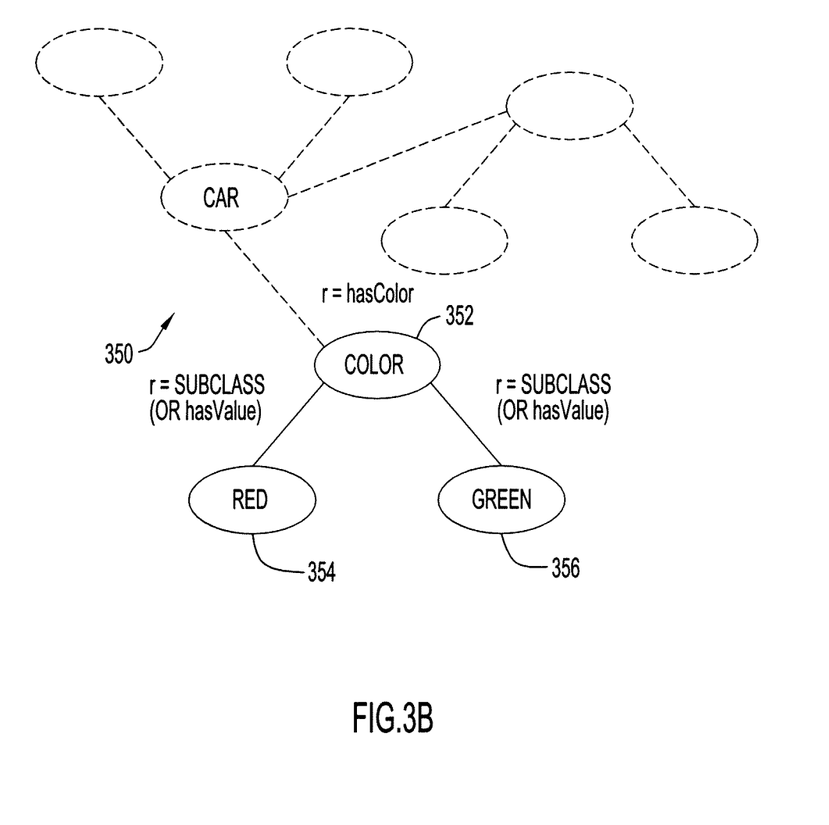
FIG. 3B is a diagrammatic illustration of an example ontology graph.

An example of determining the maximal value partition, V*, and ontological fingerprint, V', is illustrated in FIG. 3B. By way of example, a column C in a data warehouse system table includes the set of data values $\{c_i\}$ in Table II below.

TABLE II

| |
|---|
| Blue |
| Green |
| Red |
| ... |
| ... |

This example column represents a set of colors and should be classified as "Color", which would serve as the ontological fingerprint for the nature of data values that the column contains. An example Web Ontological Language (OWL)-lite ontology for a portion of the data warehouse system is represented in graphical form in FIG. 3B. Ontology 350 captures relationships and knowledge specific to the data warehouse system that contains the table defining the above column C. In the ontology graph, a node or concept 352 ("Color") is connected to related nodes or concepts 354 ("Red") and 356 ("Green") based on a relation, r, of "subclass". Thus, these nodes define a partitioning on concept 352 ("Color"). If this ontology model has captured only concepts 354 ("Red") and 356 ("Green") as colors, concept 352 ("Color") is exhaustively partitioned by concepts 354 and 356 and, thus, forms a value-partition, V.

Referring back to Table II (e.g., column C), two of the data values in the column reside in the value partition. If no other value-partition can be found that contains more than two data values from the column, the above value-partition, V, is a maximal partition, V. The class concept ("Color") corresponding to the maximal value partition, V*, becomes the ontological fingerprint, V', since this defines the nature of the data values in the column.

A manner to overcome exponential complexity is to pre-compute the partitions, and cache the partitions for further reference. This enables a lazy-reevaluation in case the ontology changes. Alternatively, this knowledge may be encoded at the time the ontology is created (e.g., the user or creator updates the list of value partitions as new knowledge is added). For example, when a new color (Blue) is added, every single value partition does not have to be re-computed, rather, the new color (Blue) may simply be added to the pre-existing and catalogued value-partition to be sorted.

Figure 4:
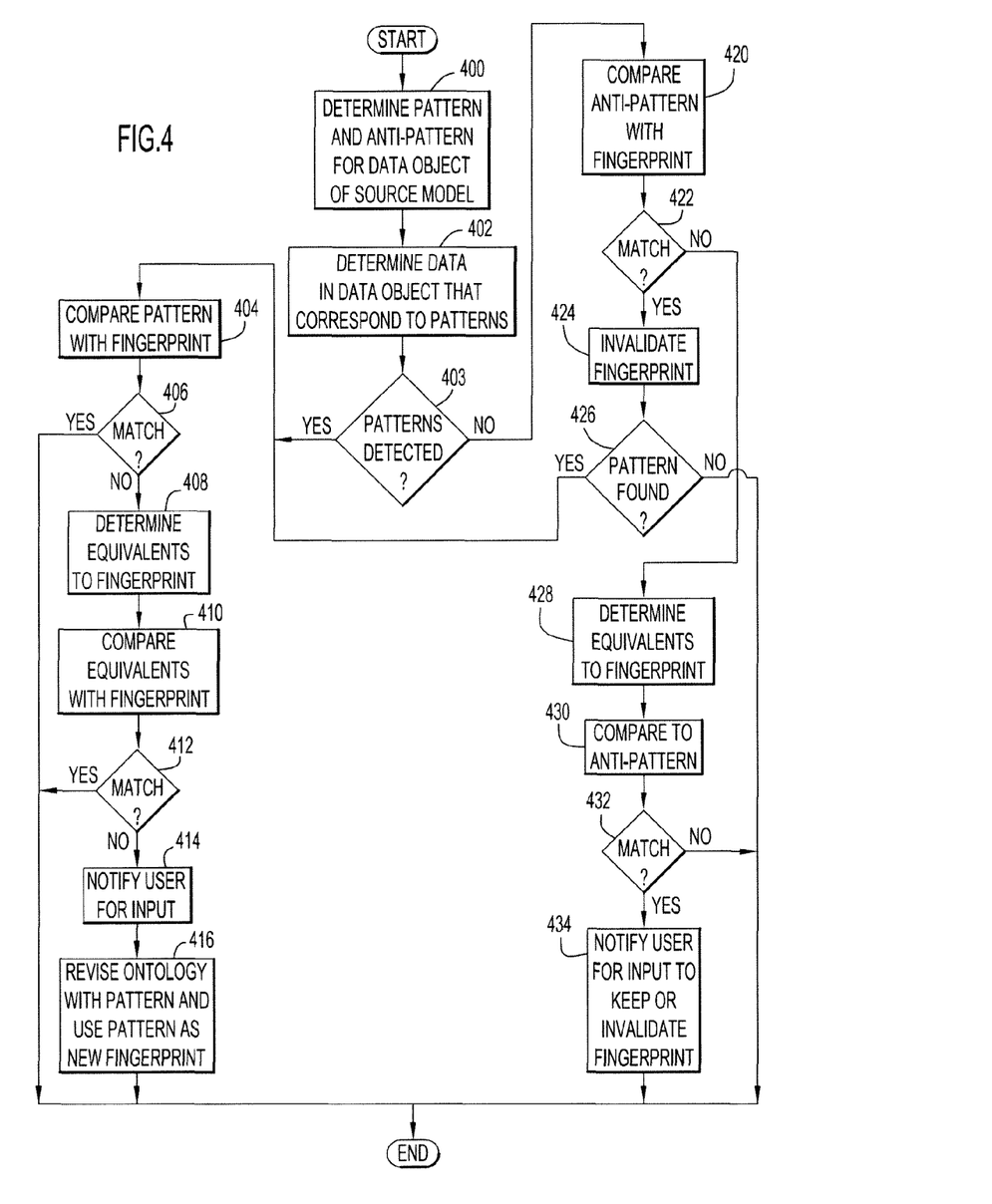
FIG. 4 is a procedural flow chart illustrating the manner in which the ontology fingerprint for a data object of a source data model is determined or revised based on statistical techniques according to an embodiment of the present invention.

A manner in which server system 110 (e.g., via map module 150) applies statistical techniques (e.g., step 210 of FIG. 2) to revise or determine an ontological fingerprint, V', is illustrated in FIG. 4. Specifically, the most-frequent patterns and possible anti-patterns are determined for data within a data object (e.g., a column of a table in data warehouse system 120) at step 400. This includes utilizing regular expression techniques to determine statistical measures that encode most frequently occurring formats for data within each data object.

The most frequent formats or patterns identify recurring formats or patterns within the data of the data object (e.g., table column of data warehouse system 120). In particular, a format mask or pattern is determined for each data element in the data object, where the format mask or pattern identifies a pattern for the data element. For example, a U.S. address (e.g., 5108 Elm St., Anytown, Tex.) may be represented by a format mask or pattern similar to: [1-9] [1-9] [1-9] [1-9] [A-Z][a-z]+ Aa [A-Z][a-z]+AA, where [1-9] [1-9] [1-9] [1-9] represent numbers or digits of the house or dwelling number (e.g., 5108), [A-Z] [a-z]+ represent an upper case character followed by one or more lower case characters for the street name (e.g., Elm), Aa represents an upper and lower case character for the type of street or road (e.g., St. or Street), [A-Z] [a-z]+ represent an upper case character followed by one or more lower case characters for the city name (e.g., Anytown), and AA represents upper case characters for the state (e.g., TX or Texas).

Once the format mask or patterns for the data elements are obtained, the most frequently occurring format or pattern is determined. This may be accomplished by determining the frequency within the data object for each of the determined patterns, and the pattern with the greatest frequency is designated as the most frequent pattern.

An anti-pattern represents a negated concept for a pattern. For example, an anti-pattern for the above U.S. Address (e.g., 5108 Elm St., Anytown, Tex.) may be:—[1-9] [A] Aa, where—[1-9] represents a negative number or digit of the house or dwelling number, [A] represents a single character for the street name, and Aa represents an upper and lower case character for the type of street or road. This pattern represents an anti-pattern for the U.S. Address since a negative number is highly unlikely to be a house number, while a single letter for a street is improbable. The anti-patterns may be pre-defined, identified as negated concepts for existing patterns, and associated with classes or domains for comparison with ontological fingerprints as described below.

Once patterns and anti-patterns are determined, the amount of data within the data object that corresponds to the pattern and anti-pattern are determined at step 402. For example, the percentage of data values in the data object that satisfy the defined pattern may be determined. This may be accomplished based on the frequency for the most frequent pattern described above (e.g., frequency of occurrence for a pattern divided by the quantity of data values in the data object). The percentage of data values in the data object that satisfy the anti-pattern may also be determined. This may be accomplished by examining and comparing each data element to the anti-pattern to determine compliance (e.g., quantity of data values complying with the anti-pattern divided by the quantity of data values in the data object). An ontological fingerprint is determined from a statistical pattern (e.g., U.S. address) or anti-pattern (e.g., NOT a U.S. address) that corresponds to the data object based on the determined data amounts and comparison of those amounts with certain predefined thresholds (e.g., >90% of data values satisfy the pattern or anti-pattern, etc.). The fingerprint is determined from the domain and/or class associated with the corresponding pattern or anti-pattern. The resulting fingerprint may replace a current ontological fingerprint determined from the above ontological techniques, or serve as that fingerprint in the case where no ontological fingerprint was able to be determined from those techniques as described above.

When a pattern is detected (e.g., sufficient data within the data object satisfy the pattern) as determined at step 403, the detected pattern is compared with the ontological fingerprint, V', at step 404. In other words, the patterns are pre-defined and associated with classes or domains as described above. The domain or class associated with the detected pattern is compared with the ontological fingerprint (representing a class or domain in the ontology as described above) to determine a match. When the detected pattern and ontological fingerprint match as determined at step 406, the current ontological fingerprint is considered to be correct and utilized for mapping as described below.

However, if the detected pattern and ontological fingerprint do not match as determined at step 406, equivalent concepts to the ontological fingerprint, V', are identified in the domain ontology at step 408. The equivalent concepts are typically pre-assigned during creation of the ontology. The equivalent concepts are compared with the detected pattern at step 410. In other words, the patterns are pre-defined and associated with classes or domains as described above. The domain or class associated with the detected pattern is compared with the equivalent concepts (representing classes or domains in the ontology) to determine a match. When the detected pattern and at least one equivalent concept match as determined at step 412, the current ontological fingerprint is considered to be correct and utilized for mapping as described below.

If no matching equivalent concept is identified as determined at step 412, the user is notified and the current ontological fingerprint V' (if determined) and the detected pattern are presented for inspection at step 414. A new equivalence relation corresponding to the ontological fingerprint, V', and/or the detected pattern may be added to the ontology based on user input at step 416, where the current ontological fingerprint or the domain/class associated with the detected pattern serves as the ontological fingerprint.

When an anti-pattern is detected (e.g., sufficient data within the data object satisfy the anti-pattern) as determined at step 403, the negated concept of the detected anti-pattern (e.g., U.S. Address in the case of an anti-pattern for NOT U.S. Address) is compared with the ontological fingerprint, V', at step 420. In other words, since the patterns are pre-defined and associated with classes or domains as described above, the domain or class associated with the negated concept of the detected anti-pattern (or the domain or class associated with the pattern representing the negated concept) is compared with the ontological fingerprint (representing a class or domain in the ontology as described above) to determine a match. When the negated concept of the detected anti-pattern and ontological fingerprint match as determined at step 422, the current ontological fingerprint is invalidated at step 424. If a pattern (in addition to the anti-pattern) is detected as determined at step 426 (e.g., a pattern for Name is detected in addition to the anti-pattern for NOT U.S. Address), the above process for handling detected patterns (e.g., step 404) is performed.

However, if the negated concept of the detected anti-pattern and ontological fingerprint do not match as determined at step 422, equivalent concepts to the ontological fingerprint, V', are identified in the domain ontology at step 428. The equivalent concepts are typically pre-assigned during creation of the ontology as described above. The equivalent concepts are compared with the negated concept of the detected anti-pattern at step 430. In other words, the patterns are pre-defined and associated with classes or domains as described above. The domain or class associated with the negated concept of the detected anti-pattern is compared with the equivalent concepts (representing classes or domains in the ontology) to determine a match. When the negated concept of the detected anti-pattern does not match at least one equivalent concept as determined at step 432, the current ontological fingerprint is considered to be correct and utilized for mapping as described below.

If a matching equivalent concept is identified as determined at step 432, the user is notified and the current ontological fingerprint V' (if determined), one or more equivalent concepts, and the domain/class associated with the detected anti-pattern are presented for inspection at step 434. The current ontological fingerprint may be accepted or invalidated, where the current ontological fingerprint, an equivalent concept, or the associated domain/class may serve as the ontological fingerprint based on user input.

Figure 5:
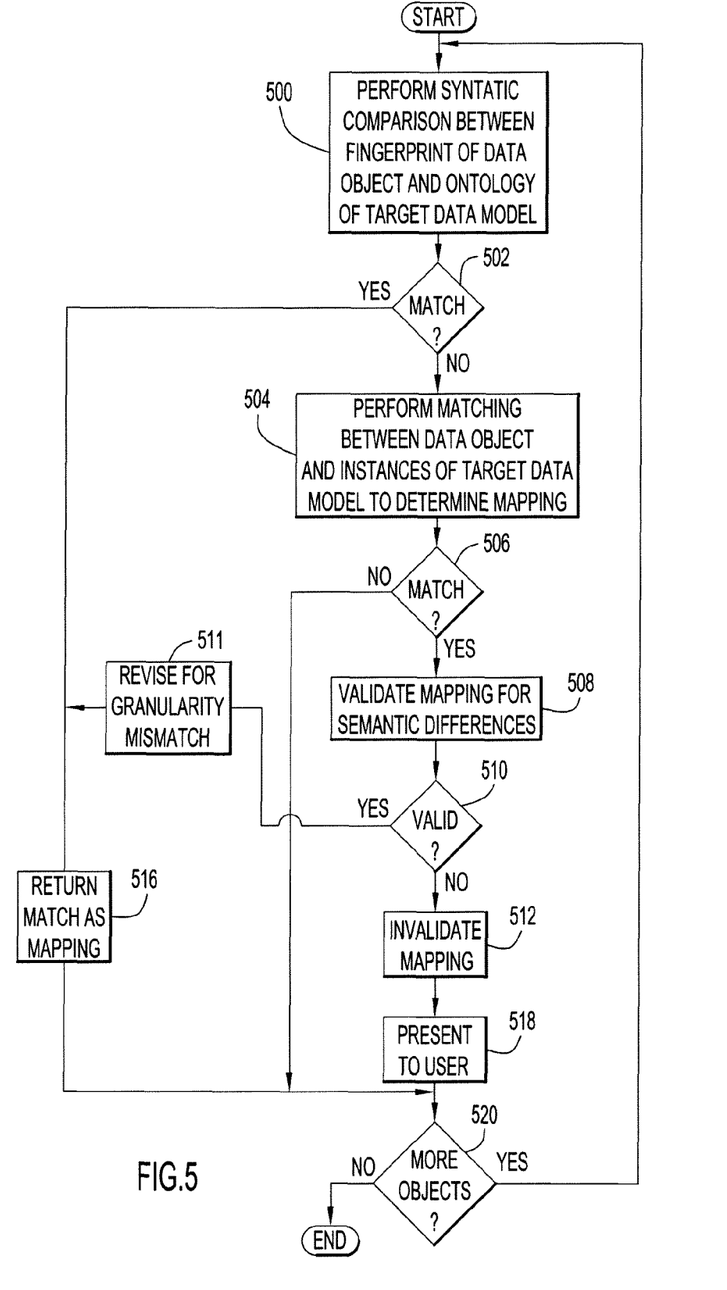
FIG. 5 is a procedural flow chart illustrating the manner in which data objects from a source data model are mapped to the ontology of a target data model according to an embodiment of the present invention.

A manner in which server system 110 (e.g., via map module 150) maps data between the source data model (e.g., data warehouse system 120) and target data model (e.g., XBRL) based on the ontological fingerprints (e.g., step 212 of FIG. 2) is illustrated in FIG. 5. Initially, once the above ontological fingerprints are determined, the extended source data model (e.g., extended due to the determined ontological fingerprints) is mapped to the target data model (e.g., XBRL). Specifically, a syntactic comparison is performed by comparing the ontological fingerprint, V', of a data object (e.g., table column within data warehouse system 120) to the concepts in the target model (e.g., XBRL) ontology at step 500. This may be accomplished by a textual comparison between the ontological fingerprint and concepts within the target ontology (e.g., the text of the concept "LineItem" may be compared to the text of the ontological fingerprint "Item"). If a concept within the target ontology matches the ontological fingerprint as determined at step 502, the data object of the source data model (e.g., table column within data warehouse system 120) is mapped to the concept of the target data model (e.g., XRBL) at step 516.

If no concept within the target ontology matches the ontological fingerprint of the data object as determined at step 502, concept matching is performed based on instances of the target data model (e.g., sample XBRL documents of a domain) and the value partition set of the data object (e.g., values of the table column in data warehouse system 120) at step 504. In particular, the instances of the target data are modeled as vectors (e.g., document vectors using a conventional term frequency—inverse document frequency (tf-idf) technique, where document terms are assigned a weight that is a statistical measure used to evaluate the importance of a word). The vectors are compared to the data values in the data object, and a conventional cosine distance measure is employed to compute a similarity value between the vectors and the data values. The similarity values are compared to one or more thresholds to determine the presence of a match for mapping (e.g., the similarity value for the vectors and data values may exceed or be below the thresholds, the quantity of vector terms and data values considered similar may be compared to thresholds to determine a match, etc.).

When the vectors are sufficiently similar to the data values to provide a mapping as determined at step 506, the mapping is verified using a data type comparison, where the data types of the ontological fingerprint (e.g., Domain (r)) of the data object and concept in the target (e.g., XBRL) ontology are compared. This enables the target data model (e.g., XBRL) to comply with semantic requirements.

If the vectors are not sufficiently similar to the data values (or the mapping verification fails) as determined at step 506, the data object and ontological fingerprint may be presented to the user at step 518 to determine an appropriate mapping.

Once a mapping exists as determined at step 506, the mapping is validated against granularity and semantic differences at step 508. Initially, a semantic difference pertains to a mapping between the source and target ontologies where the mapped items may relate to different objects. For example, a mapping for "enddate", may correspond to a document in the source ontology and a claim in the mapped ontology. In this case, the target (e.g., XBRL) ontology may have a relation "hasEndDate" with a domain "Claim", while the source data object (e.g., table column in data warehouse system 120) relates to a document (e.g., table columns do not contain a field for "Claim").

The above types of cases with semantic differences are identified for invalidation of the mapping. In particular, all relations, r, in the target (e.g., XBRL) ontology that contain the mapping as their range are identified (e.g., Range (r)=mapping). For each identified relation, the corresponding domain is determined (e.g., Domain (r)), and the domain is compared with each element in the data object (e.g., table column C=$\{c_i\}$). If the domain matches at least one data element of the data object, the mapping is considered valid.

If the mapping is invalid as determined at step 510, the mapping is invalidated or removed at step 512. In this case, the data object and ontological fingerprint may be presented to the user at step 518 to determine an appropriate mapping.

However, when the mapping is valid as determined at step 510, the presence of a granularity mismatch is determined at step 511. Initially, a granularity mismatch pertains to a mapping between a data object (e.g., table column in data warehouse system 120) and a class in the target (e.g., XBRL) ontology that is inaccurate. This inaccuracy is due to the existence of a subclass of the discovered class in the target (e.g., XBRL) ontology that provides a better mapping. For example, a table column in a data warehouse system includes an ontological fingerprint of "LineItem", while an XBRL ontology includes classes "Item", "ItemTypes", and "ItemType_Line", and a relation "hasSubType" with a domain "Item" and Range "ItemTypes". Further, "ItemType_Line" is a subclass of "ItemTypes".

A mapping may be determined between "LineItem" in the data warehouse system and "Item" in the XBRL ontology (since "Item" and "LineItem" may have similar instances). However, the finer granularity subclass, "ItemType_Line" in the XBRL ontology results in a better and more correct mapping.

In order to provide the improved mapping, the following inspection is performed. In particular, a data object (e.g., a table column C within data warehouse system 120 with an ontological fingerprint of "LineItem", or C ("LineItem")) is considered to be a mapped subclass of a class (e.g., C1 ("Item")) within the target (e.g., XBRL) ontology under at least one of the following conditions.

1) There exist classes (e.g., C2 ("ItemTypes") and C3 ("ItemType_Line")) and a relation (e.g., r ("hasSubType")) in the target (e.g., XBRL) ontology to indicate the presence of one or more subclasses of the mapped class (e.g., Domain (r)=C1 ("Item"), Range (r)=C2 ("ItemTypes"), and C3 ("ItemType_Line") is a subclass of C2 ("ItemTypes")), and the ontological fingerprint of the data object (e.g., C ("LineItem")) is syntactically similar to the subclass (e.g., C3 ("ItemType_Line")).

2) There exists a class (e.g., C3 ("ItemType_Line")) in the target (e.g., XBRL) ontology that is a subclass of the mapped class (e.g., C1 ("Item")), and the ontological fingerprint of the data object (e.g., C ("LineItem")) is syntactically similar to the subclass (e.g., C3 ("ItemType_Line")).

If either of the above conditions exist, the mapping for the data object (e.g., table column in data warehouse system 120) is revised to the corresponding subclass within the target (e.g., XBRL) ontology. Otherwise, the current mapping is considered satisfactory.

The above process is repeated to determine mappings for remaining data objects to the target (e.g., XBRL) ontology. Once the mappings have been determined for all the data objects within the source data model (e.g., corresponding to data warehouse system 120) as determined at step 520, the process terminates.

It will be appreciated that the embodiments described above and illustrated in the drawings represent only a few of the many ways of implementing embodiments for auto-mapping between source and target models using statistical and ontology techniques.

The topology or environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any commercially available or custom software (e.g., browser software, communications software, server software, mapping software, etc.). These systems may include any types of monitors and input devices (e.g., keyboard, mouse, voice recognition, etc.) to enter and/or view information.

It is to be understood that the software (e.g., map module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., map module, etc.) may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., fingerprints, mappings, etc.). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data (e.g., mappings, fingerprints, graphs, ontologies, etc.).

The classification fingerprint may include any quantity of any attributes or characteristics, and identify any portions (e.g., classes, domains, concepts, instances, etc.) of any structure (e.g., ontology, etc.) to which data belongs. The ontological fingerprint may include any quantity of any attributes or characteristics, and identify any portions (e.g., classes, domains, concepts, instances, etc.) of any structure (e.g., ontology, etc.) to which data belongs. A maximum value partition may be identified based on any quantity of data elements within the partition. The partitions may be determined in any desired fashion (e.g., quantity of elements, neighboring nodes, etc.), and may be based on any desired criteria (e.g., based on disjoint classes, enumerations of individual elements, data types, etc.). The neighboring nodes may be determined via any conventional or other techniques (e.g., breadth-first search, depth-first search, best-first search, etc.). The ontology for the source and target data models may be represented by any suitable ontology language and/or graphical representation.

The format mask and anti-patterns may be of any suitable format to identify patterns within data elements. The presence of a pattern or anti-pattern may be based on any desired thresholds (e.g., quantity or percentage of data elements satisfying the pattern or anti-pattern, etc.). The pattern and anti-pattern may be associated with any domains, classes or other objects within an ontology for the comparisons with the ontological fingerprints. The concepts within the target ontology (for patterns and anti-patterns) may include (or be associated with) any quantity of any equivalent concepts. The equivalent concepts may be any suitable concepts within the target ontology.

Any matching portion of the ontological fingerprint and concepts of the target ontology may be sufficient to establish a match for mapping (e.g., partial match of one or more portions, whole match, etc.). Further, a similarity value between the ontological fingerprint and concepts of the target ontology may be determined based on conventional or other techniques and utilized to determine a match for mapping.

Any quantity of target instances may be utilized to determine a mapping. The instances may be characterized by any suitable properties via any conventional or other techniques. The properties may be compared to data elements of the source data model based on any conventional or other similarity techniques (e.g., cosine distance, etc.), where any suitable thresholds for similarity may be utilized to determine a mapping.

The mappings may be verified based on any suitable criteria (e.g., data type or other property comparisons, semantic verification, granularity verification, any combinations thereof, etc.). The semantic verification may be based on any suitable properties (e.g., relations, etc.), and may verify that mapped objects are related in any desired fashion. The granularity verification may be based on any suitable properties (e.g., existence of classes/sub-classes, relations, syntactic or other similarities, etc.), and may verify the granularity levels of mapped objects in any desired fashion.

Present invention embodiments are not limited to the applications described above (e.g., mapping data between a data warehouse and an XBRL-based report), but rather, may be utilized to map data between any desired source and target data models.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of mapping data within a data source to a target data model comprising:
   determining an identifier for each data object of the data source based on the data within that data object, wherein the identifier indicates a corresponding entity within a source ontology of a data model of the data source to which that data object belongs, wherein the source ontology includes a plurality of entities and relations between those entities, and wherein the determining the identifier includes:

identifying for each data object a partition of one or more entities in the source ontology including a greatest amount of data from that data object; and determining the identifier for each data object based on the identified partition associated with that data object;

comparing the determined identifiers for the data objects of the data source to a target ontology of the target data model to determine mappings between the data objects of the data source and the target data model; and extracting data objects from the data source for the target data model in accordance with the mappings.

2. The computer-implemented method of claim 1, wherein the determining the identifier includes:

selectively revising the determined identifier of each data object based on a statistical technique of pattern determination applied to the data of that data object.

3. The computer-implemented method of claim 2, wherein the statistical technique includes:

determining at least one of a pattern and anti-pattern identifying a format of data within each data object and revising the determined identifier for each data object based on identifiers associated with the at least one determined pattern and anti-pattern.

4. The computer-implemented method of claim 1, Wherein the comparing the determined identifiers includes:

comparing text of the determined identifiers for the data objects of the data source to text of entities within the target data model to determine mappings between the data objects of the data source and the target data model.

5. The computer-implemented method of claim 1, wherein the comparing the determined identifiers includes:

determining properties of sample instances within the target data model and measuring similarity between the properties of the sample instances and data within the data objects; and mapping the data objects of the data source to the target data model based on the similarities.

6. The computer-implemented method of claim 5, wherein the comparing the determined identifiers further includes:

evaluating the mappings to verify mapped data objects between the source and target data models relate to common information; and evaluating the mappings to verify mapped data objects reside within a common level within respective source and target data models.

7. The computer-implemented method of claim 1, wherein the source data corresponds to data within a data warehouse, and the target data model corresponds to eXtensible Business Reporting Language (XBRL).

8. A system for mapping data within a data source to a target data model comprising:

a computer system including at least one processor configured to:

determine an identifier for each data object of the data source based on the data within that data object, wherein the identifier indicates a corresponding entity within a source ontology of a data model of the data source to which that data object belongs, wherein the source ontology includes a plurality of entities and relations between those entities, and wherein the determining the identifier includes:

identifying for ouch data a partition of one or more entities in the source ontology including a greatest amount of data from that data object; and determining the identifier for each data object based on the identified partition associated with that data object;

compare the determined identifiers for the data objects of the data source to a target ontology of the target data model to determine mappings between the data objects of the data source and the target data model; and extract data objects from the data source for the target data model in accordance with the mappings.

9. The system of claim 8, wherein the determining the identifier includes:

selectively revising the determined identifier of each data object based on a statistical technique of pattern determination applied to the data of that data object.

10. The system of claim 9, wherein the statistical technique includes:

determining at least one of a pattern and anti-pattern identifying a format of data within each data object and revising the determined identifier for each data object based on identifiers associated with the at least one determined pattern and anti-pattern.

11. The system of claim 8, wherein the comparing the determined identifiers includes:

comparing text of the determined identifiers for the data objects of the data source to text of entities within the target data model to determine mappings between the data objects of the data source and the target data model.

12. The system of claim 8, wherein the comparing the determined identifiers includes:

determining properties of sample instances within the target data model and measuring similarity between the properties of the sample instances and data within the data objects; and mapping the data objects of the data source to the target data model based on the similarities.

13. The system of claim 12, wherein the comparing the determined identifiers further includes:

evaluating the mappings to verify mapped data objects between the source and target data models relate to common information; and evaluating the mappings to verify mapped data objects reside within a common level within respective source and target data models.

14. The system of claim 8, wherein the source data corresponds to data within a data warehouse, and the target data model corresponds to eXtensible Business Reporting Language (XBRL).

15. A computer program product for mapping data within a data source to a target data model comprising:

a computer readable storage medium having computer readable program code embodied therewith, the computer readable program code comprising computer readable program code configured to:

determine an identifier for each data object of the data source based on the data within that data object, wherein the identifier indicates a corresponding entity within a source ontology of a data model of the data source to which that data object belongs, wherein the source ontology includes a plurality of entities and relations between those entities, and wherein the determining the identifier includes:

identifying for each data object a partition of one or more entities in the source ontology including a greatest amount of data from that data object; and determining the identifier for each data object based on the identified partition associated with that data object;

compare the determined identifiers for the data objects of the data source to a target ontology of the target data model to determine mappings between the data objects of the data source and the target data model; and extract data objects from the data source for the target data model in accordance with the mappings.

16. The computer program product of claim 15, wherein the determining the identifier includes:

selectively revising the determined identifier of each data object based on a statistical technique of pattern determination applied to the data of that data object.

17. The computer program product of claim 16, wherein the statistical technique includes:

determining at least one of a pattern and anti-pattern identifying a format of data within each data object and revising the determined identifier for each data object based on identifiers associated with the at least one determined pattern and anti-pattern.

18. The computer program product of claim 15, wherein the comparing the determined identifiers includes:

comparing text of the determined identifiers for the data objects of the data source to text of entities within the target data model to determine mappings between the data objects of the data source and the target data model.

19. The computer program product of claim 15, wherein the comparing the determined identifiers includes:

determining properties of sample instances within the target data model and measuring similarity between the properties of the sample instances and data within the data objects; and mapping the data objects of the data source to the target data model based on the similarities.

20. The computer program product of claim 19, wherein the comparing the determined identifiers further includes:

evaluating the mappings to verify mapped data objects between the source and target data models relate to common information; and evaluating the mappings to verify mapped data objects reside within a common level within respective source and target data models.

21. The computer program product of claim 15, wherein the source data corresponds to data within a data warehouse, and the target data model corresponds to eXtensible Business Reporting Language (XBRL).

* * * * *